United States Patent  [11] 3,607,883

| | | | |
|---|---|---|---|
| [72] | Inventors | John A. Schneider; | |
| | | Jack F. Mills, both of Midland, Mich. | |
| [21] | Appl. No. | 819,541 | |
| [22] | Filed | Apr. 24, 1969 | |
| [45] | Patented | Sept. 21, 1971 | |
| [73] | Assignee | The Dow Chemical Company | |
| | | Midland, Mich. | |

[54] BROMINE CHLORIDE-DIOXANE COMPLEX
5 Claims, No Drawings
[52] U.S. Cl. .................................................... 260/340.6,
260/559, 260/620, 260/650
[51] Int. Cl. ...................................................... C07d 15/10
[50] Field of Search ........................................... 260/340.6

[56] References Cited
OTHER REFERENCES

Hassel, et al., " Chemical Abstracts," Vol. 56, Col. 11028f, 1962.

Goy, et al., " Chemical Abstracts," Vol. 62 (1962), Col. 1322e.

*Primary Examiner*—Nicholas S. Rizzo
*Assistant Examiner*—James H. Turnipseed
*Attorneys*—Griswold & Burdick and D. H. Thurston

ABSTRACT: A bromine chloride complex of p-dioxane has been discovered which is useful as a solid source of bromine chloride. A dioxane-bromine chloride complex formed by mixing bromine chloride with dioxane in methylene chloride at 10° C. has been used to selectively brominate salicylanilide to give an 88 percent yield of 3,4′,5-tribromosalicylanilide.

3,607,883

BROMINE CHLORIDE-DIOXANE COMPLEX

BACKGROUND OF THE INVENTION

Various complexes of bromine with different compounds are shown by Z. E. Jolles in his book entitled "Bromine and Its Compounds," published by the Academic Press, New York, 1966 beginning at page 368.

SUMMARY OF THE INVENTION

According to the invention, an equimolar complex of p-dioxane and bromine chloride has been discovered which is useful as a selective brominating agent. The complex of the invention is easily prepared by mixing essentially equimolar amounts of p-dioxane and bromine chloride in the presence of a suitable solvent. Upon evaporation of the solvent, the bromine chloride complex remains as a relatively stable solid. Optionally, instead of evaporating the solvent, the bromine chloride complex may be used in the reaction solution.

The concentrations of the bromine chloride and p-dioxane in the reaction to form the complex may vary widely. The ratio of dioxane to bromine chloride may suitably range from about 0.9 to about 20 or more. The ratio is not critical, but an excess of either reactant is generally used to assure complete formation of the complex.

The bromine chloride of the present invention may suitably be introduced from the liquid bromine chloride prepared in a closed container by adding equal molar amounts of bromine and chlorine. By employing this technique, an essentially constant composition mixture of bromine chloride, with minor amounts of chlorine and bromine is introduced into the reaction chamber.

The solvent of the present invention may suitably be any organic solvent in which the reactants and products are at least partially soluble. If the solid complex is desired, a solvent that is easily separated should be used. Among the preferred solvents of the invention are the easily vaporized lower chlorinated solvents such as the methylene chloride, chloroform, carbon tetrachloride and ethylene dichloride and the lower alkyl ethers such as dimethyl and diethyl ether.

The reaction to form the complex may be suitably conducted over a wide range of temperatures, for example about 0° to about 100° C. or more. Because of the volatility and toxicity of the bromine chloride, however, the complexing reaction is preferably conducted at a temperature below 40° C.

After the complexing reaction has been completed, the solvent is evaporated and a solid reaction product is formed. The complex formed melts at 45°–55° C. and is unstable over an extended period of time because of the slow evolution of bromine chloride.

The greatest advantage of the bromine chloride complex formed in the present invention is the fact that the complex is a ready source of bromine chloride having a low vapor pressure. This is distinguished from neat bromine chloride. When the bromine chloride is used without complexing, the high vapor pressure and toxicity of the bromine chloride vapors makes handling difficult and dangerous.

Another surprising feature of the invention is the ability of the bromine chloride complexes to selectively brominate organic compounds. With the complex, a narrower range of isomers in a bromination reaction is obtained. In addition, the complex is a milder brominating agent than bromine chloride as such.

SPECIFIC EMBODIMENTS

Example 1

A dioxane-bromine chloride complex was prepared at a temperature of 10° C. by adding dropwise 35.2 g. (0.4 mole) of 1,4-dioxane to a solution of 49 g. (0.42 mole) of bromine chloride in 100 ml. of methylene chloride. The methylene chloride was removed under reduced pressure, and 60.5 g. of an orange solid melting at 45°–55° C. was obtained. Based on the dioxane used in the reaction, the orange solid was 74 percent of the theoretical yield.

Example 2

The specificity of the p-dioxane-bromine chloride complex of example 1 as compared to the use of bromine chloride and bromine was analyzed by the bromination of salicylanilide. The object of the bromination was to maximize the yield of the tribromo compound. The comparative results of the tests of dioxane-bromine chloride complex, bromine chloride and bromine all in methylene chloride are summarized in table I.

TABLE I

[A comparison in the use of a dioxane-BrCl complex, BrCl and $Br_2$ to prepare 3,4',5-tribromosalicylanilide from salicylanilide]

| | p-Dioxane-BrCl | BrCl | $Br_2$ |
|---|---|---|---|
| Conditions: | | | |
| Temperature, °C | 0–20 | Room | 0–20 |
| Time, hours | 3 | 2 | 2 |
| Br+/salicylanilide | 4 | 3 | 3 |
| Solvent/salicylanilide | [1] 10 | [2] 16.7 | [2] 16.7 |
| Chlorine content in products, percent | 0.3 | 0.2 | 0.2 |
| Products: | | | |
| 3,5-dibromo, percent | | 4 | Trace |
| 4',5-dibromo, percent | 1.5 | 24 | 30 |
| 3,4',5-tribromo, percent | 88 | 64 | 70 |
| 2,3,4',5-tetrabromo, percent | 10 | 7 | |

[1] Dioxane solvent.
[2] Methylene chloride solvent.

In the same manner as described above, the complex of example 1 may also be used to selectively brominate other polybrominatable compounds such as bisphenol, benzene, p-xylene and the like to make tetrabromobisphenol, mono and dibromobenzene and monobromo-p-xylene.

We claim:
1. The complex of p-dioxane with bromine chloride.
2. The process for preparing the composition of matter defined in claim 1 comprising reacting by contacting in a suitable solvent bromine chloride with p-dioxane.
3. The process defined in claim 2 wherein the ratio of dioxane to bromine chloride is about 0.9 to about 20.
4. The process defined in claim 2 wherein the solvent is a lower chlorinated solvent or lower alkyl ether.
5. The process defined in claim 2 wherein the temperature is less than 40° C.